(12) United States Patent
Gondre et al.

(10) Patent No.: US 12,037,924 B2
(45) Date of Patent: Jul. 16, 2024

(54) BLADE MADE OF COMPOSITE MATERIAL WITH VARIABLE-DENSITY ATTACHED LEADING EDGE

(71) Applicant: SAFRAN AIRCRAFT ENGINES, Paris (FR)

(72) Inventors: Guillaume Pascal Jean-Charles Gondre, Moissy-Cramayel (FR); Olivier Bazot, Moissy-Cramayel (FR); Matthieu Pierre Michel Dubosc, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/784,932

(22) PCT Filed: Dec. 14, 2020

(86) PCT No.: PCT/FR2020/052432
§ 371 (c)(1),
(2) Date: Jun. 13, 2022

(87) PCT Pub. No.: WO2021/123594
PCT Pub. Date: Jun. 24, 2021

(65) Prior Publication Data
US 2023/0003133 A1    Jan. 5, 2023

(30) Foreign Application Priority Data
Dec. 18, 2019  (FR) ........................................ 1914746

(51) Int. Cl.
*F01D 5/28*    (2006.01)
*F01D 5/14*    (2006.01)
(Continued)

(52) U.S. Cl.
CPC ............. *F01D 5/288* (2013.01); *F01D 5/147* (2013.01); *F05D 2220/32* (2013.01);
(Continued)

(58) Field of Classification Search
CPC .... F04D 29/324; F04D 29/023; F04D 29/289; F04D 29/388; F05D 2240/303;
(Continued)

(56) References Cited

U.S. PATENT DOCUMENTS 8,851,855 B2 * 10/2014 James ..................... F01D 5/282
                                                        416/224
9,689,269 B2 * 6/2017 Bottome ................. F01D 5/147
(Continued)

FOREIGN PATENT DOCUMENTS

EP    2 037 082 A1    3/2009
EP    2 405 101 A2    1/2012
(Continued)

OTHER PUBLICATIONS

EOS Titanium TI64 Grade 5 Material Data Sheet. EOS, Jul. 2022, www.eos.info/03_system-related-assets/material-related-contents/metal-materials-and-examples/metal-material-datasheet/titan/ti64/material_datasheet_eos_titanium_ti64_grade5_en_web.pdf. Accessed Jul. 13, 2023. (Year: 2023).*
(Continued)

*Primary Examiner* — Eric J Zamora Alvarez
(74) *Attorney, Agent, or Firm* — Pillsbury Winthrop Shaw Pittman LLP

(57) ABSTRACT

A method for manufacturing a blade from composite material having an added metal leading edge for a gas turbine aeroengine includes producing a blade body from composite material including a blade root part, a shank part and an airfoil body part; manufacturing, via additive manufacturing, a leading edge extending in a longitudinal direction
(Continued)

between a lower end present at the shank part of the composite material and an upper end present at the tip; bonding the manufactured leading edge onto the foremost edge portion of the airfoil body of the blade body.

7 Claims, 3 Drawing Sheets

(51) Int. Cl.
  *F04D 29/02*    (2006.01)
  *F04D 29/32*    (2006.01)

(52) U.S. Cl.
  CPC ...... *F05D 2230/20* (2013.01); *F05D 2230/31* (2013.01); *F05D 2240/30* (2013.01)

(58) Field of Classification Search
  CPC ............. F05D 2240/30; F05D 2230/23; F05D 2230/20; F05D 2230/31; F05D 2300/133; F05D 2220/36; F05D 2300/603; F05D 2220/32; F05D 2240/121; F05D 2220/323; F05D 2300/10; F05D 2300/173; F05D 2300/501; F05D 2300/174; F05D 2240/307; F05D 2300/171; F01D 5/282; F01D 5/147; F01D 5/288; F01D 21/045; F01D 5/286; F01D 9/041; F01D 5/141; F01D 5/16; Y02T 50/60

See application file for complete search history.

(56) References Cited

U.S. PATENT DOCUMENTS

| | | |
|---|---|---|
| 2005/0084377 A1 | 4/2005 | Dambrine et al. |
| 2007/0092379 A1 | 4/2007 | Coupe et al. |
| 2015/0151485 A1 | 6/2015 | Godon et al. |
| 2016/0167269 A1 | 6/2016 | Pautard |
| 2016/0177744 A1 | 6/2016 | Benson |
| 2019/0242260 A1 | 8/2019 | Kray et al. |
| 2020/0182062 A1* | 6/2020 | Gemeinhardt ..... B29D 99/0025 |

FOREIGN PATENT DOCUMENTS

| | | |
|---|---|---|
| FR | 2 684 719 A1 | 6/1993 |
| FR | 2 994 708 A1 | 2/2014 |
| WO | WO 2017/055727 A1 | 4/2017 |

OTHER PUBLICATIONS

Celebi et al. Evaluation of Tantalum Alloy with Titanium in Universal Powder Bed System, Accessed Jul. 13, 2023. (Year: 2023).*
International Search Report as issued in International Patent Application No. PCT/FR2020/052432, dated May 7, 2021.

* cited by examiner

[Fig. 1]
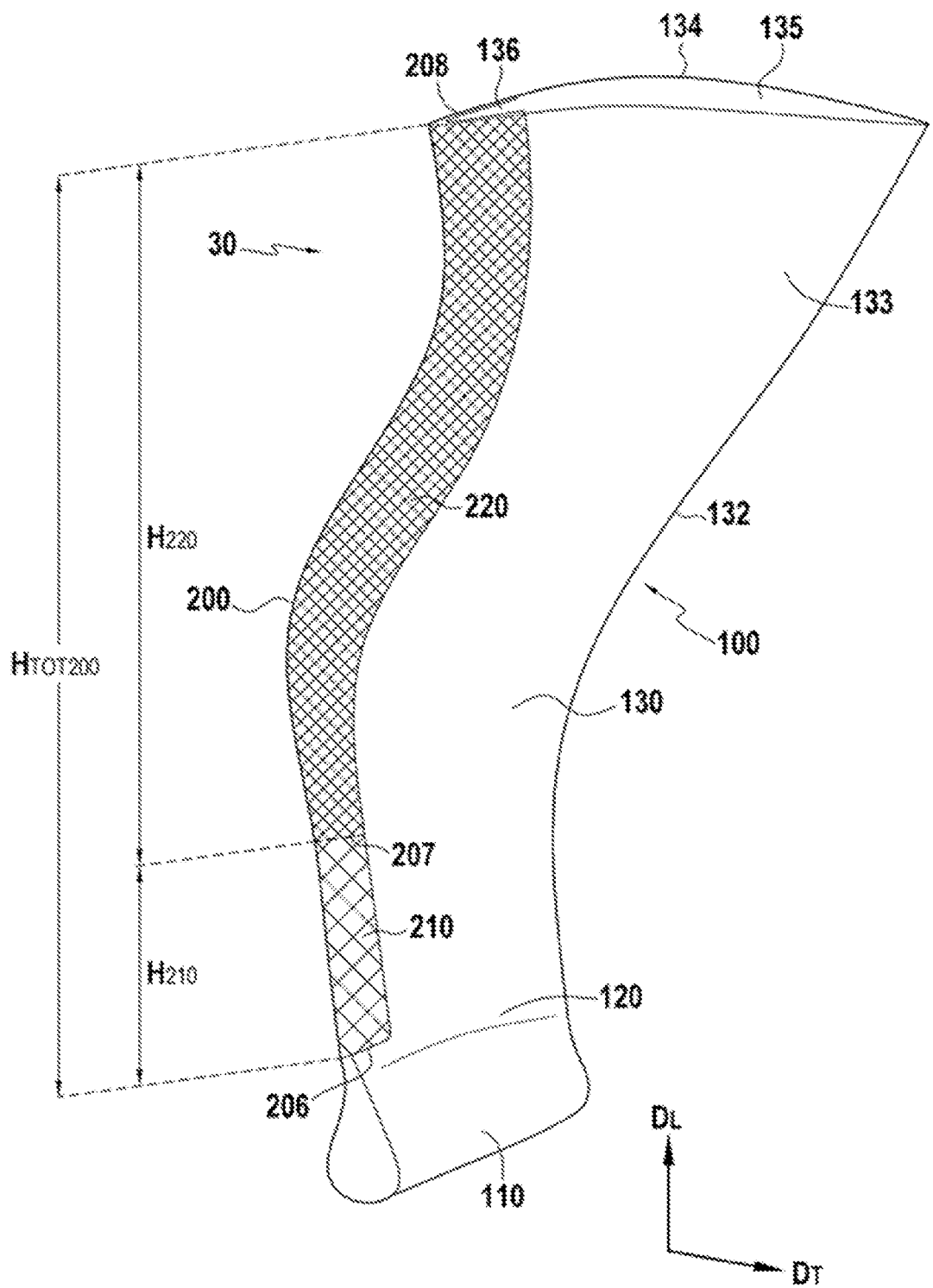

[Fig. 2]
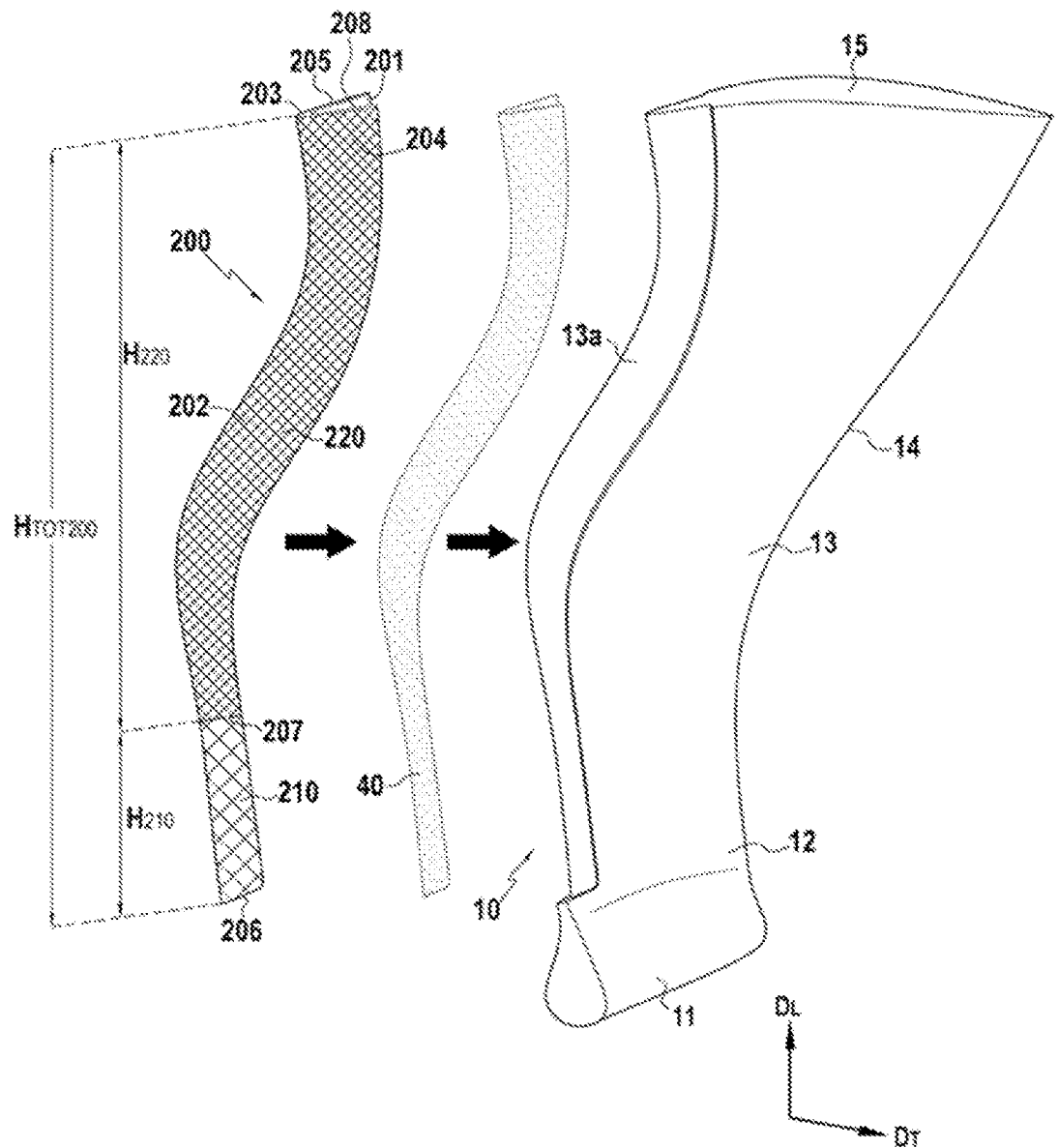

[Fig. 3]
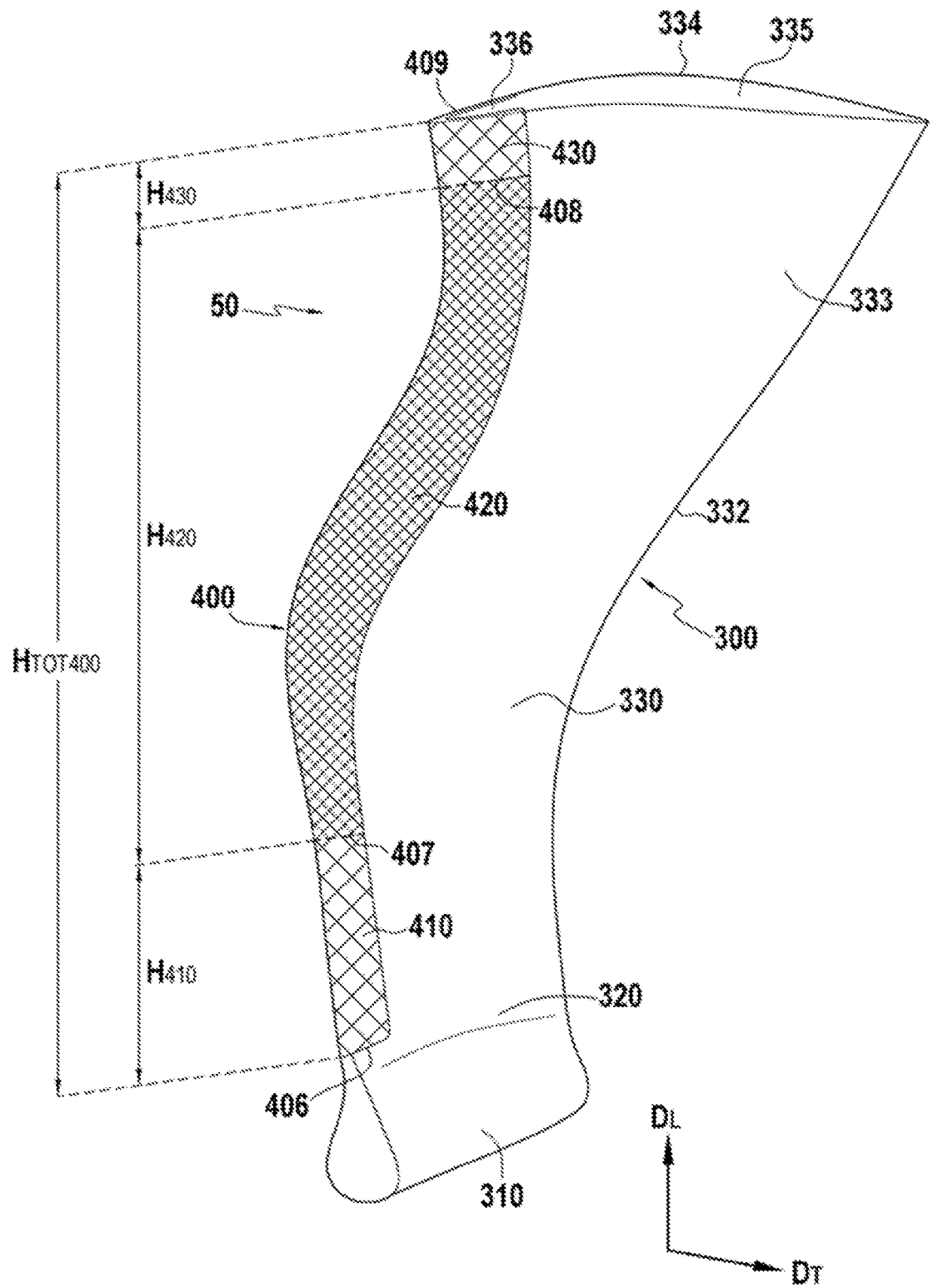

BLADE MADE OF COMPOSITE MATERIAL WITH VARIABLE-DENSITY ATTACHED LEADING EDGE

CROSS-REFERENCE TO RELATED APPLICATIONS

This application is the U.S. National Stage of PCT/FR2020/052432, filed Dec. 14, 2020, which in turn claims priority to French patent application number 1914746 filed Dec. 18, 2019. The content of these applications are incorporated herein by reference in their entireties.

TECHNICAL FIELD

The present invention relates to the general field of the manufacture of blades in composite material comprising a metal leading edge, for gas turbine aeroengine.

PRIOR ART

The presence of a metal leading edge on a blade in composite material of a gas turbine aeroengine provides protection for the composite blade assembly against foreign object impacts such as bird strikes. This is particularly the case for the mobile fan blades of a gas turbine aeroengine which are exposed to ingestion of birds, hail, ice etc.

The manufacture of said blade first comprises the production of a "blade body" in composite material comprising a fibrous reinforcement densified with a matrix generally obtained from a thermosetting (TS) or thermoplastic (TP) resin.

Once the blade body in composite material is obtained, a protective metal leading edge must be assembled onto the foremost edge thereof. For this purpose, the metal strip produced by mechanical methods such as stamping, forming or electro-forming for example, is bonded onto the foremost edge of the blade in composite material. This operation can be performed in a mould to ensure bonding of the metal strip. Examples of blades in composite material provided with a metal leading edge are described in particular in documents US 2007/092379 and US 2016/0167269.

Added leading edges are generally fabricated in titanium for reasons of weight savings. While titanium has good mechanical strength, the high-speed impact of a foreign object, in particular a bird, on a leading edge in titanium nevertheless causes deformation (bending) thereof. One solution can be to increase the stiffness of the leading edge by increasing the thickness thereof, or to use a denser material. However, in this case, the overall weight of the leading edge is significantly increased and hence also the centrifugal force to which the composite material of the blade is subjected, in particular at the root shank thereof which is a critical area of the blade for static stresses.

DESCRIPTION OF THE INVENTION

It is therefore the main object of the present invention to propose a method for manufacturing a blade in composite material provided with a metal leading edge which does not have the aforementioned disadvantages.

In the invention, this object is reached by means of a method for manufacturing a blade in composite material having an added metal leading edge, for gas turbine aeroengine, the method comprising:
  producing a blade body in composite material comprising,
    in longitudinal direction a blade root part, a shank part and an airfoil body part, the airfoil body part extending in longitudinal direction between the shank part and an airfoil body tip, and in transverse direction between a foremost edge portion and rear edge portion;
  manufacturing, via additive manufacturing, a leading edge extending in longitudinal direction between a lower end, intended to be present at the shank part of the blade body in composite material, and an upper end intended to be present at the tip of the airfoil body part;
  bonding the manufactured leading edge onto the foremost edge portion of the airfoil body of the blade body in composite material,
  characterized in that the leading edge comprises a first portion in a first metal material and extending from the lower end of the leading edge as far as an intermediate position located between the lower end and upper end of the leading edge, and a second portion in a second metal material extending from the intermediate position as far as the upper end of said leading edge, the second metal material having greater density than the density of the first metal material.

In this manner, a blade in composite material is obtained provided with a leading edge having variable density, the leading edge having the greatest density and hence the greatest stiffness in the upper part of the blade corresponding to that part of the blade that is most sensitive to foreign object impacts. The leading edge has lesser density in the lower part of the blade which is scarcely exposed and/or less sensitive to foreign object impact. The blade obtained has very good resistance to impact in the area to be reinforced against ingestion of foreign objects, without significantly penalising the overall weight of the blade having regard to the presence of a portion of lesser density. This also avoids increasing the static stresses generated by centrifugal force at the shank part which is an area of concentration of forces in the composite material blade structure.

According to one particular characteristic of the method of the invention, the first portion extends in longitudinal direction over a height corresponding to 30% of total airflow height, whilst the second portion extends in longitudinal direction over a height corresponding to 70% of total airflow height.

According to another particular characteristic of the method of the invention, the first material is steel or titanium while the second material is a nickel or cobalt alloy.

According to a further particular characteristic of the method of the invention, the first material is titanium while the second material is steel.

The invention also concerns a method for manufacturing a blade in composite material having an added metal leading edge, for gas turbine aeroengine, the method comprising:
  producing a blade body in composite material comprising
    in longitudinal direction a blade root part, a shank part and an airfoil body part, the airfoil body part extending in longitudinal direction between the shank part and an airfoil body tip and in transverse direction between a foremost edge portion and rear edge portion,
  manufacturing, via additive manufacturing, a leading edge extending in longitudinal direction between a lower end intended to be present at the shank part of the blade body in composite material, and an upper end intended to be present at the tip of the airfoil body part,
  bonding the manufactured leading edge onto the foremost edge portion of the airfoil body of the blade body in composite material,
  characterized in that the leading edge comprises a first portion in a first metal material and extending from the lower end of the leading edge as far as a first intermediate position located between the lower end and upper end of the leading edge, a second portion in a second metal material extending from the first intermediate position as far as a second intermediate position, and a third portion in a third metal material extending from the second intermediate position as far as the upper end of said leading edge, the second metal material having greater density than the density of the first and third metal materials.

In this manner, a blade in composite material is obtained provided with a leading edge of variable density, the leading edge having the greatest density and therefore the greatest stiffness in the upper part of the blade corresponding to that of the blade that is most sensitive to foreign object impacts. The leading edge has lesser density in the lower part of the blade that is scarcely exposed and/or less sensitive to foreign object impacts. The blade thus obtained has very good resistance against impact in the area to be reinforced against ingestion of foreign objects, without significantly penalising the overall weight of the blade having regard to the presence of two portions of lesser density. This also avoids increasing the static stresses generated by centrifugal force, in particular at the shank part which is an area of concentration of forces in the composite material blade structure.

According to one particular characteristic of the method of the invention, the first portion extends in longitudinal direction over a height corresponding to 30% of total airflow height, while the second portion extends in longitudinal direction over a height corresponding to 60% of total airflow height, and the third portion extends in longitudinal direction over a height corresponding to 10% of total airflow height.

According to another particular characteristic of the method of the invention, the first and third metal materials are steel or titanium, while the second metal material is a nickel or cobalt alloy.

According to a further particular characteristic of the method of the invention, the first and third metal materials are titanium while the second metal material is steel.

A further subject of the invention is a blade in composite material having an added metal leading edge for gas turbine aeroengine, the blade comprising a blade structure in composite material comprising in longitudinal direction a blade root, a shank and an airfoil body, the airfoil body extending in longitudinal direction between the shank and a blade tip and in transverse direction between a foremost edge portion and rear edge, and a leading edge bonded onto the foremost edge portion of the airfoil body of the blade structure in composite material, the leading edge extending in longitudinal direction between a lower end present at the shank of the blade structure in composite material and an upper end present at the tip of the blade of said blade structure, characterized in that the leading edge comprises a first portion in a first metal material and extending from the lower end of the leading edge as far as an intermediate position located between the lower end and upper end of the leading edge, and a second portion in a second metal material extending from the intermediate position as far as the upper end of said leading edge, the second metal material having greater density than the density of the first metal material.

The blade of the invention therefore comprises a leading edge having variable density with the greatest density and therefore the greatest stiffness in the upper part of the blade corresponding to that part of the blade that is most sensitive to foreign object impacts. The leading edge has lesser density in the lower part of the blade which is scarcely exposed and/or less sensitive to foreign object impacts. The blade thus obtained has very good resistance against impacts in the area to be reinforced against ingestion of foreign bodies without significantly penalising the overall weight of the blade having regard to the presence of a portion of lesser density. This also avoids increasing the static stresses generated by centrifugal force at the shank part which is an area of concentration of forces in the composite material blade structure.

According to one particular characteristic of the blade of the invention, the first portion extends in longitudinal direction over a height corresponding to 30% of total airflow height while the second portion extends in longitudinal direction over a height corresponding to 70% of total airflow height.

A further subject of the invention is a blade in composite material having an added metal leading edge for gas turbine aeroengine, the blade comprising a blade structure in composite material comprising in longitudinal direction a blade root, a shank and an airfoil body, the airfoil body extending in longitudinal direction between the shank and blade tip, and in transverse direction between a foremost edge portion and rear edge, and a leading edge bonded onto the foremost edge portion of the airfoil body of the blade structure in composite material, the leading edge extending in longitudinal direction between a lower end present at the shank of the blade structure in composite material and an upper end present at the blade tip of said blade structure, characterized in that the leading edge comprises a first portion in a first metal material and extending from the lower end of the leading edge as far as a first intermediate position located between the lower end and upper end of the leading edge, a second portion in a second metal material extending from the first intermediate position as far as a second intermediate position, and a third portion in a third metal material extending from the second intermediate position as far as the upper end of said leading edge, the second metal material having greater density than the density of the first and third metal materials.

The blade of the invention therefore comprises a leading edge having variable density with the greatest density and hence the greatest stiffness in the upper part of the blade corresponding to that part of the blade that is most sensitive to foreign object impacts. The leading edge has lesser density in the lower part of the blade which is scarcely exposed and/or less sensitive to foreign object impacts. The blade therefore has very good resistance to impacts in the area to be reinforced against ingestion of foreign objects without significantly penalising the overall weight of the blade having regard to the presence of two portions of lesser density. This also avoids increasing the static stresses generated by centrifugal force in particular at the shank part which is an area of concentration of forces in the composite material blade structure.

BRIEF DESCRIPTION OF THE FIGURES

FIG. 1 is a schematic, perspective view of a blade in composite material provided with an added metal leading edge conforming to one embodiment of the invention.

FIG. 2 is an exploded, schematic, perspective view showing the assembling of a metal leading edge onto a blade body in composite material.

FIG. 3 is a schematic perspective view of a blade in composite material provided with an added metal leading edge conforming to another embodiment of the invention.

DESCRIPTION OF EMBODIMENTS

The invention applies to the manufacture of blades in composite material having a metal leading edge, for gas turbine aeroengine.

A method conforming to the invention is described in connection with the manufacture of a fan blade such as the blade 30 illustrated in FIG. 1 which comprises a blade structure in composite material 100 comprising in longitudinal direction $D_L$ a blade root 110, a shank 120 and an airfoil body 130 extending in transverse direction $D_T$ between a leading edge 200 and a trailing edge 132. The airfoil body 130 also comprises a lower surface 133 and upper surface 134 and a tip 135. The leading edge 200 is composed of a strip in metal material bonded onto a foremost edge portion 136 of the airfoil body 130. With the exception of the leading edge 200, the blade 30 is in composite material.

The method for manufacturing the blade starts by producing a blade body in composite material obtained from a fibrous reinforcement densified with a matrix. By "blade body", it is meant herein a blade body entirely in composite material comprising most of the constituent parts of the final blade namely the blade root, shank and airfoil body such as described in the foregoing, with the exception of the leading edge which is composed of a metal strip added onto the blade body as described in detail below.

The blade body is produced from a fibrous preform able to be obtained in different manners known to persons skilled in the art. Typically, the preform can be obtained directly by three-dimensional (3D) weaving of yarns (formed of carbon fibres for example) or by lay-up of two-dimensional fibrous fabrics. The manufacture of a fan blade in composite material obtained from a fibrous reinforcement formed by three-dimensional weaving and densified with a matrix is particularly described in document US 2005/084377. In the example described herein, the fan blade preform is obtained by 3D weaving of carbon fibre yarns.

In known manner, the blade preform is impregnated with a liquid composition containing a precursor of the matrix material. The precursor is usually in the form of a polymer such as a resin optionally diluted in a solvent. The preform is placed in a mould which can be hermetically sealed with a housing having the shape of the moulded blade body and able to be of twisted shape in particular corresponding to the final shape of the airfoil body with aerodynamic profile. The mould is closed and the liquid matrix precursor is injected e.g. an epoxy resin into the entire housing to impregnate all the fibrous part of the preform. Impregnation of the blade fibrous preform can particularly be obtained with the well-known method of Resin Transfer Moulding—RTM.

Conversion of the precursor to a matrix e.g. by curing is performed by heat treatment generally by heating the mould, after removing any solvent, and crosslinking of the polymer, the preform remaining in the mould having a shape matching that of the structure with aerodynamic profile. The matrix can particularly be obtained from epoxy resins such as the high—performance epoxy resin sold under the reference PR 520 by CYTEC, or from liquid precursors of carbon or ceramic matrixes.

For the forming of a carbon or ceramic matrix, heat treatment entails pyrolyzing the organic precursor to convert the organic matrix to a carbon or ceramic matrix depending on the precursor used and conditions of pyrolysis. For example, liquid carbon precursors can be resins with relatively high coke content such as phenolic resins, while liquid ceramic precursors of SiC in particular can be resins of polycarbosilane (PCS), or polytitanocarbosilane (PTCS) or polysilazane (PSZ) type. Several consecutive cycles, starting from impregnation up until heat treatment, can be carried out to reach the desired degree of densification.

After formation of the matrix, the part is released from the mould. It is finally trimmed to remove excess resin and the chamfers are machined. No other machining is necessary since, being moulded, the part meets required dimensions. A blade body 10 is obtained which, as illustrated in FIG. 2, comprises a blade root part 11 corresponding to the blade root 110 of the blade structure 100 of the blade 30 described in the foregoing, a shank part 12 corresponding to the shank 120 of the blade structure 100 of the blade 30 and an airfoil body part 13 corresponding to the airfoil body 130 of the blade structure 100 of the blade 30, the airfoil body part extending between the shank part 12 and an airfoil body tip 15 (corresponding to the tip 135 of the airfoil body 130 of the blade structure 100 of the blade 30). The airfoil body part 13 comprises a foremost edge portion 13a corresponding to the foremost edge portion 136 of the airfoil body 130 of the blade structure 100 of the blade 30. The foremost edge portion13a is intended to receive a metal strip to form the leading edge of the final blade.

After, or parallel with, production of the blade body, a near-finished leading edge (metal strip) having the shape and dimensions defined in a theoretical digital model of the leading edge is manufactured by additive manufacturing. Among the known methods for additive manufacturing, the following methods can particularly be used to obtain the leading edge:

metal additive manufacturing process in layers whereby particles are bonded via fusion using a laser source, also known as powder bed additive manufacturing or SLM (Selective Laser Melting) or LBM (Laser Beam Melting), Laser Metal Deposition (LMD), metal additive manufacturing in layers whereby particles are bonded via fusion using an electron beam—"Electron Beam Melting".

After additive manufacturing, a leading edge is obtained which already has the shape (external geometry) and desired final dimensions ("net-shape" part). This obviates the need for machining and adapted mechanical polishing operation of the outer wall of the leading edge, these usually being carried out when leading edges are obtained by casting for example and are complex to perform on account of the flexibility of the part. These finishing operations can be replaced here by a surface treatment operation, for example an electrochemical polishing sequence which does not impact the dimensions of the leading edge.

This gives a finished leading edge or metal strip 200 ready to be assembled onto the blade body 10 as illustrated in FIG. 2. The leading edge 200 comprises an inner wall 201 intended to be bonded on the foremost edge portion 13a of the blade body 10 and an outer wall 202 defining the profile of the leading edge of the final blade. The leading edge 200 also comprises a nose portion 203 from which there extend two wings 204 and 205.

In the invention, the leading edge 200 comprises a first portion 210 in a first metal material. The first portion 210 extends from the lower end 206 of the leading edge as far as an intermediate position 207 located between a lower end 206 and an upper end 208 of the leading edge. The leading edge 200 also comprises a second portion 220 in a second metal material. The second portion 220 extends from the intermediate position 207 as far as the upper end 208 of the leading edge. By means of additive manufacturing, it is possible to manufacture a leading edge with several different metal materials.

The first portion 210 extends in longitudinal direction $D_L$ over a height $H_{210}$ corresponding to about 30% of total airflow height $H_{TOT200}$ starting from the lower end 206 of the leading edge. By definition, the minimum radial height of 0% of the leading edge corresponds to the point of intersection between the leading edge of the blade with a disc on which it is intended to be mounted, this point of intersection innerly delimiting the airflow path passing through the fan. Similarly, the maximum radial height of 100% corresponds to that point of the line of the leading edge that is radially the highest.

The first portion 210 is intended to extend into an area or airflow height (or leading edge height) of the blade where foreign object impact, in particular a bird strike, is not critical since it only causes slight deformation of the leading edge. The first portion 210 can therefore be composed of a first metal material of average density.

The second portion 220 extends in longitudinal direction $D_L$ over a height $H_{220}$ corresponding to 70% of total airflow height $H_{TOT200}$ starting from the intermediate position 207. Unlike the first portion 210, the second portion 220 is intended to extend into an area or airflow height of the blade where foreign object impact such as a bird strike is critical. For example, for a fan blade, ingestion of a large-size bird is critical at about 50% of total airflow height while ingestion of an average-sized bird is critical at about 85% of total airflow height. The second portion 220 is therefore in a second metal material having greater density than the density of the first metal material. As non-limiting examples:
- the first metal material can be steel or titanium while the second metal material is a nickel alloy such as Inconel® 718, or a cobalt alloy;
- the first metal material can be titanium while the second metal material can be steel.

The last step in the manufacture of the blade is the bonding of the metal leading edge 200 onto the blade body 10 in composite material. More specifically, as illustrated in FIG. 2, the leading edge 200 is docked onto the foremost edge portion 13a present on the airfoil body part 13 of the blade body 10 interposing a layer of adhesive or adhesive material 40 between the inner wall 201 of the leading edge and the foremost edge portion 13a of the blade body 10. The layer of adhesive between the leading edge and the foremost edge portion of the blade body can be applied in different manners. In particular it may correspond to an adhesive material sandwiched between the inner wall of the leading edge and the foremost edge portion of the blade body; the whole, once assembled, being placed in a bonding mould which is heated to activate (cure) the adhesive property of the material. A layer of adhesive can also be directly deposited on the inner wall 201 of the leading edge 200 and/or on the foremost edge portion 13a of the blade body, assembling being performed in a bonding mould able to apply pressure on the elements to be assembled and optionally to carry out bonding heat treatment. A method for bonding a leading edge onto a blade body in composite material is described in particular in document US 2015/151485.

The blade 30 thus obtained has very good resistance against impacts in the area to be reinforced against ingestion of foreign objects, without significantly penalising the overall weight of the blade having regard to the presence of a portion of lesser density. This also avoids increasing the static stresses generated by centrifugal force at the shank part which is an area of concentration of forces in the composite material blade structure.

FIG. 3 illustrates a blade 50 differing from blade 30 already described, in that the area over which there extends the portion of dense material on the leading edge is reduced at the upper end of the leading edge. More specifically, the blade 50 illustrated in FIG. 3 comprises a blade structure in composite material 300 comprising in longitudinal direction $D_L$ a blade root 310, a shank 320 and an airfoil body 330 extending in transverse direction $D_T$ between a leading edge 400 and a trailing edge 332. The airfoil body 330 also comprises a lower surface 333, an upper surface 334 and a tip 335. The leading edge 400 is composed of a metal strip bonded onto a foremost edge portion 336 of the airfoil body 330. With the exception of the leading edge 400, the blade 50 is in composite material.

The manufacture of the blade body and of the metal strip added onto the blade body to form the leading edge of the final blade is the same as described previously for blade 30 and is not further described for reasons of simplification. It is simply noted that the leading edge comprises three portions of different densities.

Conforming to the invention, the leading edge 400 comprises a first portion 410 in a first metal material. The first portion 410 extends from the lower end 406 of the leading edge as far as a first intermediate position 407 located between the lower end 406 and upper end 409 of the leading edge. The leading edge 400 comprises a second portion 420 in a second metal material. The second portion 420 extends from the first intermediate position 407 as far as a second intermediate position 408 located between the lower end 406 and upper end 409 of the leading edge above the first intermediate position in longitudinal direction $D_L$. The leading edge 400 also comprises a third portion 430 in a third metal material. The third portion 430 extends from the second intermediate position 408 as far as the upper end 409 of the leading edge 400. By means of additive manufacturing, it is possible to manufacture a leading edge with several different metal materials.

The first portion 410 extends in longitudinal direction $D_L$ over a height $H_{410}$ corresponding to about 30% of total airflow height $H_{TOT400}$ starting from the lower end 406 of the leading edge. The third portion 430 extends over a height $H_{430}$ corresponding to about 10% of total airflow height $H_{TOT400}$ starting from the second intermediate position 408. The first and third portions are intended to extend into an area or airflow height of the blade where foreign object impact, in particular a bird strike, is not critical. The first and third portions 410 and 430 can therefore respectively be composed of the first and third materials of average density. The first and third metal materials can be the same or different.

The second portion 420 extends in longitudinal direction $D_L$ over a height $H_{420}$ corresponding to 60% of total airflow height $H_{TOT400}$ starting from the first intermediate position 407. Unlike the first and second third portions 410 and 430, the second portion 420 is intended to extend into an area or airflow height where foreign object impact such as a bird strike is critical. The second portion 420 is therefore in a second metal material of greater density than the first material or third material. As non-limiting examples:
- the first and third metal material can be steel or titanium while the second metal material is a nickel alloy such as Inconel® 718, or a cobalt alloy;
- the first and third metal materials can be titanium while the second metal material is steel.

This embodiment allows further savings in the overall weight of the blade through the presence of two portions of lesser density.

The invention claimed is:

1. A method for manufacturing a blade in composite material having an added metal leading edge for a gas turbine aeroengine, the method comprising:
producing a blade body from composite material comprising a blade root part, a shank part and an airfoil body part, the airfoil body part extending in a longitudinal direction between the shank part and an airfoil body tip and in a transverse direction between a foremost edge portion and a rear edge portion,
additively manufacturing the metal leading edge extending in the longitudinal direction between a lower end to be present at the shank part of the blade body in composite material and an upper end to be present at the tip of the airfoil body part, and
bonding the metal leading edge onto the foremost edge portion of the airfoil body,
wherein the metal leading edge comprises a first portion in a first metal material and extending from the lower end of the leading edge as far as an intermediate position located between the lower end and upper end of the leading edge, and a second portion in a second metal material extending from the intermediate position as far as the upper end of the leading edge in an upper part of the blade, the second metal material having a greater density than a density of the first metal material so that the leading edge has a greatest stiffness in the upper part of the blade.

2. The method according to claim 1, wherein the first portion extends in the longitudinal direction over a height corresponding to 30% of a total airflow height while the second portion extends in the longitudinal direction over a height corresponding to 70% of the total airflow height.

3. The method according to claim 1, wherein the first metal material is steel or titanium, while the second metal material is a nickel or cobalt alloy.

4. The method according to claim 1, wherein the first metal material is titanium while the second metal material is steel.

5. The method according to claim 1, wherein the first portion extends in the longitudinal direction over a first height and the second portion extends in the longitudinal direction over a second height that is greater than the first height.

6. A blade in composite material having an added metal leading edge for a gas turbine aeroengine, the blade comprising a blade structure in composite material comprising a blade root, a shank and an airfoil body, the airfoil body extending in a longitudinal direction between the shank and a blade tip and in a transverse direction between a foremost edge portion and a rear edge portion, and a metal leading edge bonded onto the foremost edge portion of the airfoil body of the blade structure in composite material, the leading edge extending in the longitudinal direction between a lower end present at the shank of the blade structure in composite material and an upper end present at the blade tip of said blade structure, wherein the metal leading edge comprises a first portion in a first metal material and extending from the lower end of the leading edge as far as an intermediate position located between the lower end and upper end of the leading edge, and a second portion in a second metal material and extending from the intermediate position as far as the upper end of said leading edge, the second metal material having a greater density than a density of the first metal material so that the leading edge has a greatest stiffness in the upper part of the blade.

7. The blade according to claim 6, wherein the first portion extends in the longitudinal direction over a height corresponding to 30% of a total airflow height while the second portion extends in the longitudinal direction over a height corresponding to 70% of the total airflow height.

* * * * *